United States Patent [19]

Yoneyama

[11] Patent Number: 5,054,899
[45] Date of Patent: Oct. 8, 1991

[54] MEDIUM TELEPHOTO LENS SYSTEM
[75] Inventor: Shuhji Yoneyama, Tokyo, Japan
[73] Assignee: Asahi Kogaku Kogyo K.K., Tokyo, Japan
[21] Appl. No.: 430,549
[22] Filed: Nov. 1, 1989
[30] Foreign Application Priority Data
Nov. 2, 1988 [JP] Japan .................................. 63-278401
[51] Int. Cl.$^5$ .............................................. G02B 13/02
[52] U.S. Cl. ..................................................... 359/745
[58] Field of Search ......................................... 350/454
[56] References Cited

U.S. PATENT DOCUMENTS

| 4,545,654 | 10/1985 | Sato | 350/454 |
| 4,812,026 | 3/1989 | Iima | 350/454 |

FOREIGN PATENT DOCUMENTS

| 2632461 | 1/1977 | Fed. Rep. of Germany . |
| 50-62630 | 5/1975 | Japan . |
| 51-62037 | 5/1976 | Japan . |
| 51-77226 | 7/1976 | Japan . |
| 53-10425 | 1/1978 | Japan . |
| 53-133029 | 11/1978 | Japan . |
| 54-50321 | 4/1979 | Japan . |
| 55-124115 | 9/1980 | Japan . |
| 57-40218 | 3/1982 | Japan . |
| 58-126512 | 7/1983 | Japan . |
| 59-48723 | 3/1984 | Japan . |
| 59-65820 | 4/1984 | Japan . |
| 59-65821 | 4/1984 | Japan . |
| 62-244010 | 10/1987 | Japan . |
| 1283690 | 1/1987 | U.S.S.R. .............................. 350/454 |

Primary Examiner—Scott J. Sugarman
Attorney, Agent, or Firm—Sughrue, Mion, Zinn, Macpeak & Seas

[57] ABSTRACT

A telephoto lens system which composed of a front group comprising, in order from the object side, a positive first lens having a convex surface of large curvature directed toward the object, a positive meniscus second lens having a convex surface of large curvature directed toward the object and a negative third lens having a concave surface of large curvature directed toward the image, and a rear group comprising, in order from the object side, a biconvex fourth lens, a biconcave fifth lens, a positive sixth lens and a seventh lens having a weak positive refractive power, all lenses except the seventh lens being moved in unison to effect focusing. The lens system satisfies conditions which result in a light weight lens system having a focal length of about 100 mm and a large effective aperture ratio of 1:2.0, and which is capable of satisfactory compensation for spherical aberration and astigmatism over a shooting range from infinity to close-up at a magnification of about −0.1×.

6 Claims, 4 Drawing Sheets

MEDIUM TELEPHOTO LENS SYSTEM

BACKGROUND OF THE INVENTION

The present invention relates to a telephoto system for use with 35 mm single-lens reflex cameras. More particularly, the present invention relates to a high-speed telephoto lens system having an F number of 2.0 and a focal length of about 100 mm.

Auto focus single-lens reflex cameras which perform automatic focusing with a motor-driven lens system have seen a rapid increase in popularity. In response to this market trend, there has been a growing need to reduce the weight of lens groups movable during focusing in order to accomplish faster focusing with photographic lenses.

Two types of lens systems have conventionally been used as telephoto lenses having a focal length of about 100 mm, i.e., a modified Gauss type as described in JP-A-53-10425 (the term "JP-A" as used herein means an "unexamined published Japanese patent application"), JP-A-57-40218, JP-A-58-21221, JP-A-59-48723 and JP-A-62-244010, and an Ernostar type as described in JP-A-50-62630, JP-A-51-62037, JP-A-51-77226, JP-A-53-133029, JP-A-54-50321, JP-A-55-124115, JP-A-58-126512, JP-A-59-65820, and JP-A-59-65821. While numerous improvements have been made in these types of lens systems, the examples mentioned above are the closer in design to the lens system of the present invention.

Lens system of a modified Gauss type are advantageous for the purpose of increasing the effective aperture ratio, but they suffer from the disadvantage that the lens closer to the image than the diaphragm stop has a tendency to increase in size. Further, these lens systems are made of glass having a comparatively high refractive index, but the high index glass has such a high specific gravity that it is not suitable from the standpoint of reducing the lens weight. In contrast, lens systems of an Ernostar type are advantageous in that they are light in weight since the rear group can be made of a simpler construction than lenses of a modified Gauss type. However, it has been difficult to attain a large effective aperture ratio on the order of 1:2.0 with these lens systems although they are capable of efficient compensation for aberrations up to the level of 1:2.8.

SUMMARY OF THE INVENTION

The present invention has been accomplished in order to solve the aforementioned problems of the prior art, and its principal object is to provide a high-performance telephoto lens system for use with 35 mm single-lens reflex cameras that has a focal length of about 100 mm and a large effective aperture ratio of 1:2.0, is comparatively light in weight, and is capable of satisfactory compensation for spherical aberration and astigmatism over the shooting range from infinity to close-up at a magnification of about $-0.1X$.

The above-stated object of the present invention can generally be attained by a telephoto lens system which is composed of a front group comprising, in order from the object side, a positive first lens having a convex surface of large curvature directed toward the object, a positive meniscus second lens having a convex surface of large curvature directed toward the object and a negative third lens having a concave surface of large curvature directed toward the image, and a rear group comprising, in order from the object side, a biconvex fourth lens, a biconcave fifth lens, a positive sixth lens and a seventh lens having a weak positive refractive power, all lenses except the seventh lens being moved in unison to effect focusing. This system satisfies the following condition:

$$f/|f_{8,9}| < 0.7 \qquad (1)$$

where,
f is the focal length of the overall system;
$f_{8,9}$ is the focal length from the eighth to ninth surface (i.e., the aerial lens between the fourth and fifth lenses) as calculated by:

$$\frac{1}{f_{8,9}} = \left( \frac{1-n_4}{r_8} + \frac{n_5-1}{r_9} - d_8 \cdot \frac{1-n_4}{r_8} \cdot \frac{n_5-1}{r_9} \right)$$

$n_4$ is the refractive index of the fourth lens at the d-line;
$n_5$ is the refractive index of the fifth lens at the d-line;
$r_8$ is the radius of curvature of the surface of the fourth lens on the image side;
$r_9$ is the radius of curvature of the surface of the fifth lens on the object side; and
$d_8$ is the aerial distance between the fourth and fifth lenses.

As described above, the present invention successfully meets the requirements for light weight and high performance in spite of a large effective aperture ratio, by adopting a rear group that is of a new and different type than in convention lens systems of a modified Gauss type or an Ernostar type. Even better results can be attained if the lens system having the features described above further satisfies the following conditions:

$$1.5 < (n_1+n_2)/2 < 1.7 \qquad (2)$$

$$55 < (\nu_1+\nu_2)/2 \qquad (3)$$

$$0.05 < f/f_{1.6} < 0.35 \qquad (4)$$

$$1.5 < f/f_{1.8} < 2.3 \qquad (5)$$

$$0.0 < d_8/f < 0.04 \qquad (6)$$

$$0.8 < f/f_{1.12} < 1.0 \qquad (7)$$

where,
$n_1$ is the refractive index of the first lens at the d-line;
$n_2$ is the refractive index of the second lens at the d-line;
$\nu_1$ is the Abbe number of the first lens;
$\nu_2$ is the Abbe number of the second lens;
$f_{1.6}$ is the focal length from the first to sixth surface;
$f_{1.8}$ is the focal length from the first to eighth surface; and
$f_{1.12}$ is the focal length from the first to twelfth surface.

BRIEF DESCRIPTION OF THE DRAWINGS

The present invention will be more clearly understood with reference to the following description in conjunction with the accompanying drawings, in which.

DETAILED DESCRIPTION OF THE PREFERRED EMBODIMENTS

Figure 1:
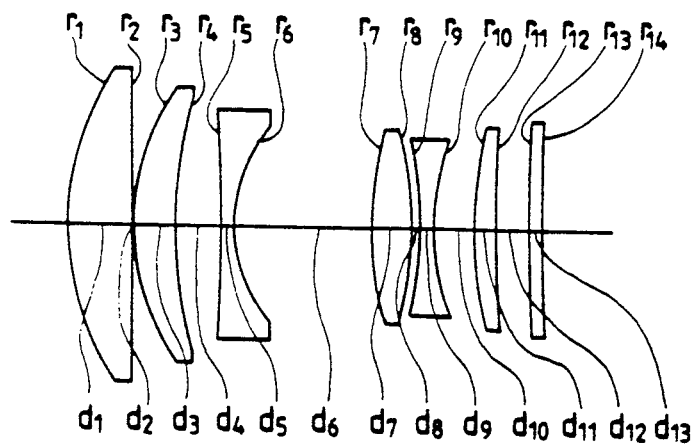
FIG. 1 is a schematic cross-sectional view of a telephoto lens system constructed in accordance with Example 1 of the present invention and which is focused at infinity.
Figure 2:
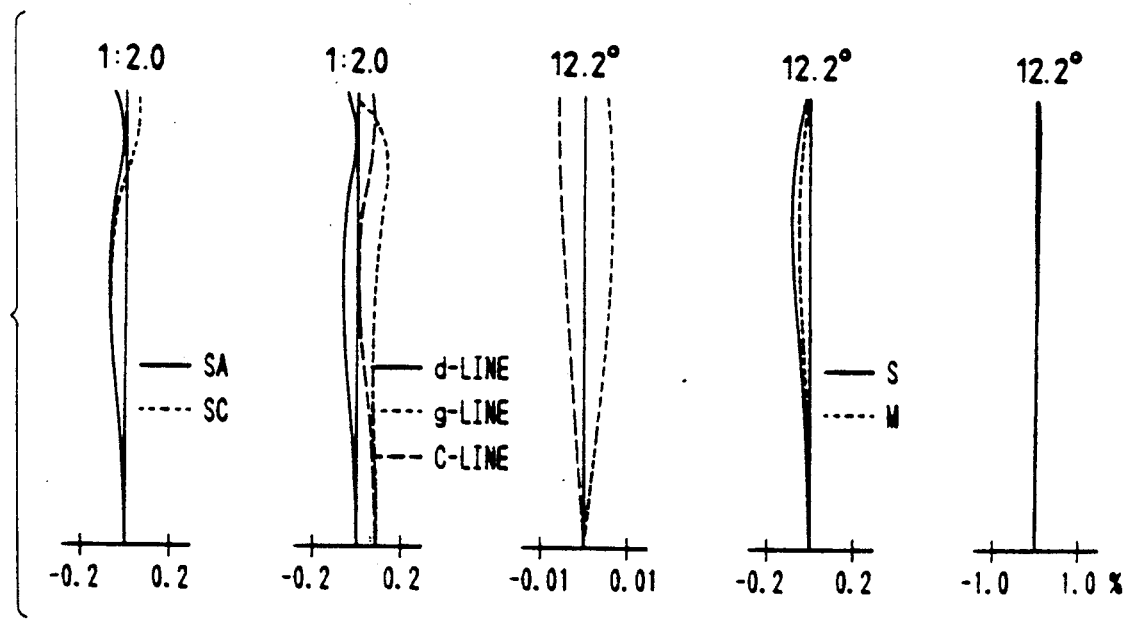
FIG. 2 is a graph plotting the aberration curves obtained with the lens system of FIG. 1 when it is focused at infinity.
Figure 3:
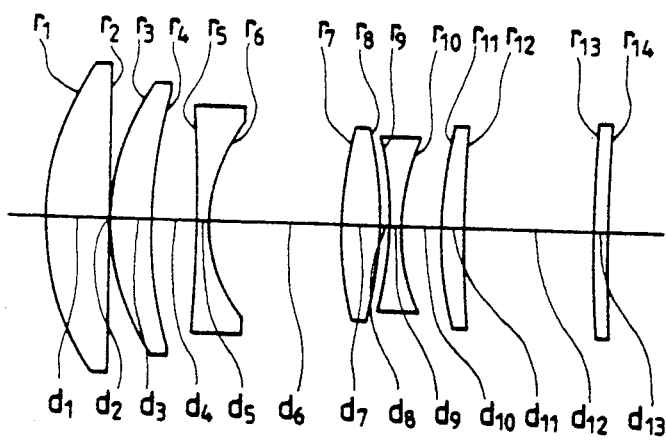
FIG. 3 is a schematic cross-sectional view of a telephoto lens system constructed in accordance with Example 1 of the present invention and which is focused at the nearest distance.
Figure 4:
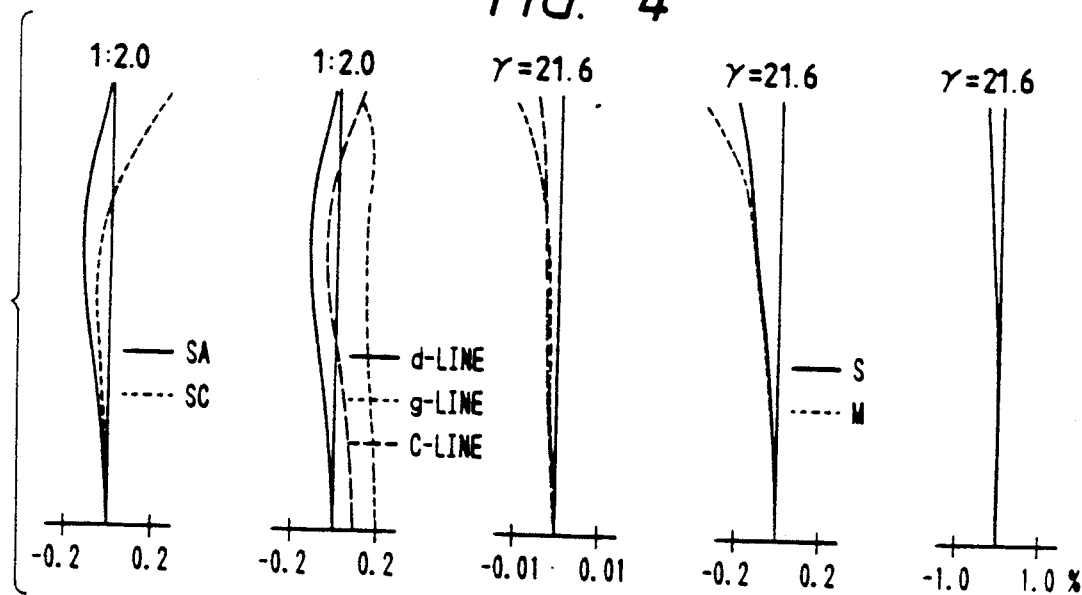
FIG. 4 is a graph plotting the aberration curves obtained with the lens system of FIG. 3 when it is focused at the nearest distance.
Figure 5:
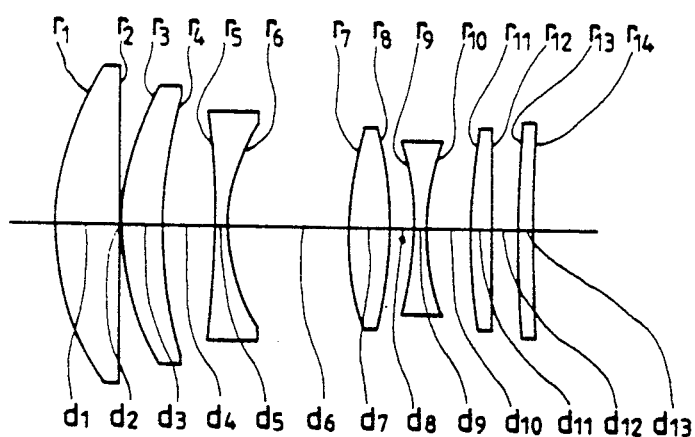
FIG. 5 is a schematic cross-sectional view of a telephoto lens system constructed in accordance with Example 2 of the present invention and which is focused at infinity.
Figure 6:
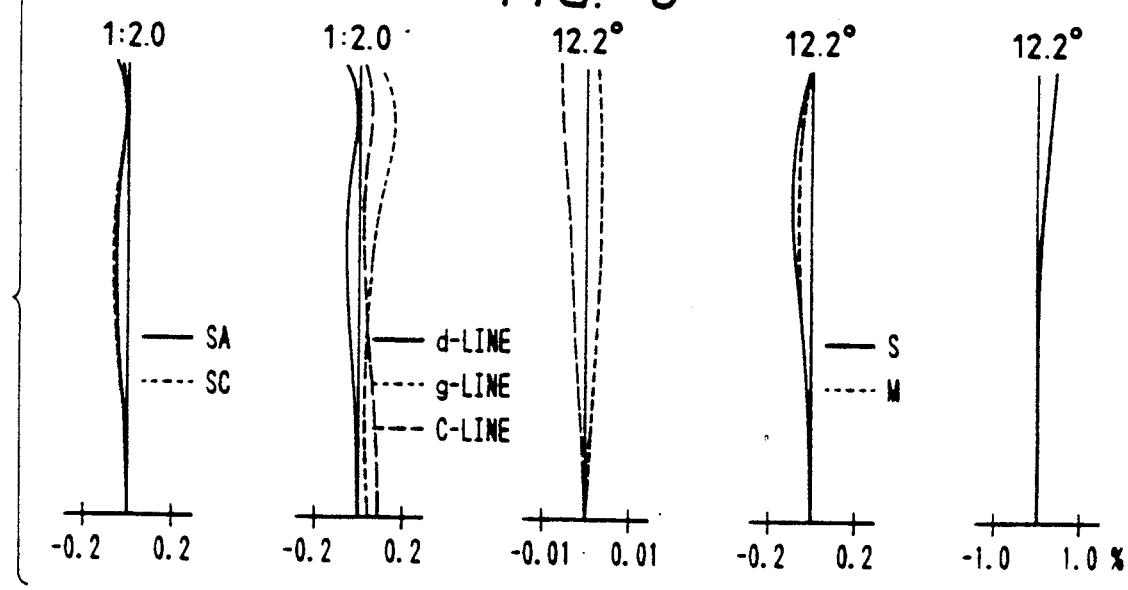
FIG. 6 is a graph plotting the aberration curves obtained with the lens system of FIG. 5 when it is focused at infinity.
Figure 7:
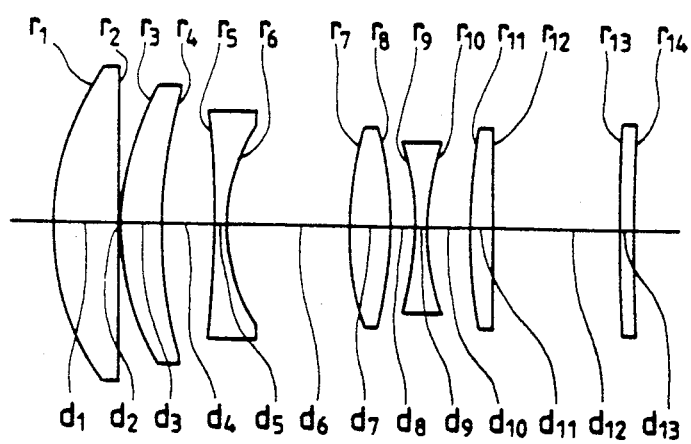
FIG. 7 is a schematic cross-sectional view of a telephoto lens system constructed in accordance with Example 2 of the present invention and which is focused at the nearest distance.
Figure 8:
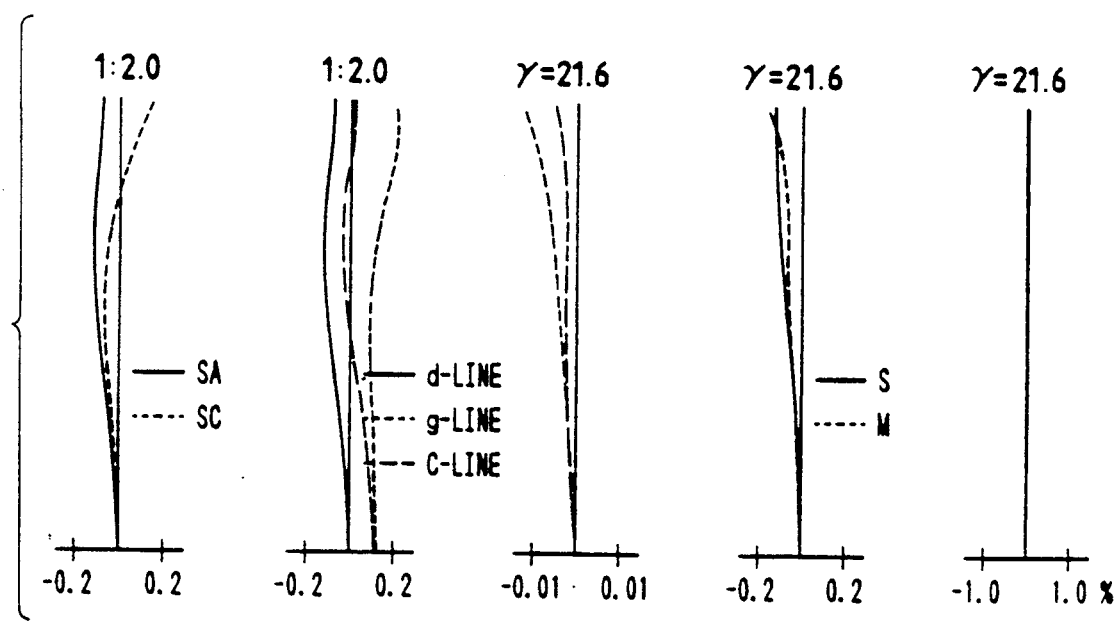
FIG. 8 is a graph plotting the aberration curves obtained with the lens system of FIG. 7 when it is focused at the nearest distance.

The structure of the lens system according to the present invention is briefly described in the Summary given earlier herein, which will now be explained in detail.

In order to attain the objectives of large effective aperture ratio and light weight, the present invention adopts a different design in the rear group than what has been employed in lens systems of a modified Gauss type or an Ernostar type. In a modified Gauss type, the rear group (which is the closer to the image than the diaphragm stop) starts with a negative-to-positive cemented lens. In such a lens arrangement, the incident height of axial rays of light is first increased at the negative lens element of the cemented lens in order to attain the desired aperture ratio, but this inevitably causes an increase in the diameter of the subsequent positive lens element, which leads to a larger curvature and an increase in the volume and, hence, increased weight of the lens. In contrast, the rear group of the lens system of the present invention starts with a positive lens which is not cemented to any of the subsequent lenses. By adopting this arrangement, the diameter of the rear group is held comparatively small and the curvature of each lens is sufficiently reduced to prevent the increase in lens volume.

Lens systems of an Ernostar type adopt a fairly simple construction in the rear group and hence are advantageous from the viewpoint of light weight, but, as already mentioned, it has been difficult to attain a large effective aperture ratio with the Ernostar type. In the system of the present invention, the spherical aberration that will develop when a large effective aperture ratio is provided is compensated by the aerial distance between the fourth and fifth lenses. Condition (1) sets forth the requirement that should be met by the power of this aerial distance. If this condition is not met, compensation for spherical aberration cannot be achieved.

Condition (2) relates to the refractive indices of the first and second lenses. The specific gravity of optical glass materials generally increases with increasing refractive index. If the upper limit of condition (2) is exceeded, glass of low specific gravity is not easily obtainable and considerable difficulty will be encountered in realizing a light weight lens system. If the lower limit of condition (2) is not reached, the surfaces of the first and second lenses have an excessive power and it becomes difficult to maintain an appropriate Petzval sum.

Condition (3) relates to chromatic aberration, and satisfying this condition is effective in suppressing the chromatic aberration which may develop in the first and second lenses.

Condition (4) relates to the power of the front group which comprises the first to third lenses. If the lower limit of this condition is not reached, the power of the negative third lens will become too strong to insure efficient compensation for chromatic and other aberrations. In addition, the ray intercept of the fourth lens will become too high to realize a lighter lens system by reducing the size of the rear group. If the upper limit of condition (4) is exceeded, the ray intercept of the fourth lens becomes too low to achieve effective compensation for spherical aberration by means of the surface of the fifth lens on the object side. In addition, it becomes difficult to insure that the refractive indices of the first and second lenses will satisfy condition (2).

Condition (5) sets forth the requirement that should be satisfied by the composite power of the first to eighth surfaces. If the lower limit of this condition is not reached, the ray intercept of the fifth lens will not be low enough to prevent undercompensation for spherical aberration. It also becomes difficult to keep the Petzval sum to a small value. Further, the diameter of the fifth lens becomes too great to make a lighter system. If the upper limit of condition (5) is exceeded, the power of the fourth lens will become too strong to prevent overcompensation for spherical aberration.

Condition (6) specifies the aerial distance between the fourth and fifth lenses. If the upper limit of this condition is exceeded, the ray intercept of the fourth lens will become so different from the intercept of the fifth lens that the resulting occurrence of higher-order aberrations is too extensive to achieve satisfactory compensation for spherical aberration and astigmatism. If the lower limit of condition (6) is not reached, the diameter of the fifth lens becomes so large that it is impossible to realize a lighter system. Further, spherical aberration and astigmatism will be undercompensated.

Condition (7) relates to the composite focal length from the first to sixth lenses which are to move during focusing. If the lower limit of this condition is not reached, large aberrational variations will occur during focusing at a near distance, making it difficult to achieve satisfactory compensation for coma. If the upper limit of condition (7) is exceeded, the first to sixth lenses have to be moved by a large amount during focusing and this is not desirable from the viewpoint of lens barrel design because the barrel length is unduly increased.

Two examples of the present invention are described hereinafter with reference to data tables, in which f is the composite focal length of the overall system, $F_{FO}$ is an F number, $\omega$ is a half viewing angle, $f_B$ is the back focus for an object at infinity, r is the radius of curvature of an individual lens surface, d is the lens thickness or aerial distance between adjacent lenses, N is the refractive index of an individual lens at the d-line, and $\nu$ is the Abbe number of an individual lens.

| Example 1 | | | | |
|---|---|---|---|---|
| $F_{NO} = 1:2.0$ | | | $f = 100.00$ | |
| $\omega = 12.2°$ | | | $f_B = 39.91$ | |
| Surface No. | r | d | N | $\nu$ |
| 1 | 42.277 | 10.355 | 1.48749 | 70.2 |
| 2 | ∞ | 0.202 | | |
| 3 | 36.768 | 6.567 | 1.61800 | 63.4 |
| 4 | 75.567 | 7.143 | | |
| 5 | −417.542 | 2.021 | 1.63980 | 34.5 |
| 6 | 23.661 | 21.468 | | |
| 7 | 52.924 | 6.516 | 1.83400 | 37.2 |
| 8 | −52.924 | 1.303 | | |
| 9 | −58.721 | 2.021 | 1.68893 | 31.1 |
| 10 | 36.540 | 6.243 | | |
| 11 | 58.045 | 3.576 | 1.83400 | 37.2 |
| 12 | 177.301 | 5.142 ~ 20.765 | | |
| 13 | 202.052 | 2.526 | 1.58913 | 61.2 |
| 14 | 734.879 | | | |

(1) $f / |f_{8.9}| = 0.427$
(2) $(n_1 + n_2) / 2 = 1.553$
(3) $(\nu_1 + \nu_2) / 2 = 66.8$
(4) $f / f_{1-6} = 0.205$
(5) $f / f_{1-8} = 2.016$
(6) $d_8 / f = 0.013$
(7) $f / f_{1-12} = 0.911$

| Example 2 | | | | |
|---|---|---|---|---|
| $F_{NO} = 1:2.1$ | | | $f = 100.00$ | |
| $\omega = 12.2°$ | | | $f_B = 39.39$ | |
| Surface No. | r | d | N | $\nu$ |
| 1 | 41.137 | 10.606 | 1.48749 | 70.2 |
| 2 | −2824.967 | 0.202 | | |
| 3 | 41.450 | 6.465 | 1.61800 | 63.4 |
| 4 | 73.478 | 8.208 | | |
| 5 | −160.506 | 2.020 | 1.66680 | 33.0 |
| 6 | 28.446 | 19.042 | | |
| 7 | 50.901 | 6.667 | 1.80610 | 40.9 |
| 8 | −59.819 | 3.556 | | |
| 9 | −50.469 | 2.020 | 1.64769 | 33.8 |
| 10 | 41.218 | 6.519 | | |
| 11 | 85.053 | 3.636 | 1.83400 | 37.2 |
| 12 | −1906.667 | 4.097 ~ 19.754 | | |
| 13 | 193.969 | 2.525 | 1.58913 | 61.2 |
| 14 | 654.721 | | | |

(1) $f / |f_{8.9}| = 0.126$
(2) $(n_1 + n_2) / 2 = 1.553$
(3) $(\nu_1 + \nu_2) / 2 = 66.8$
(4) $f / f_{1-6} = 0.115$
(5) $f / f_{1-8} = 1.863$
(6) $d_8 / f = 0.036$
(7) $f / f_{1-12} = 0.911$

As described above, the present invention provides a high-performance medium telephoto lens system that features a large effective aperture ratio of 1:2.0 and which is nevertheless comparatively light weight and capable of satisfactory compensation for spherical aberration and astigmatism over the shooting range from infinity to close-up.

What is claimed:

1. A telephoto lens system comprising:
a front group having, in order from the object side, a positive first lens having a convex surface of large curvature directed toward the object, a positive meniscus second lens having a convex surface of large curvature directed toward the object, and a negative third lens having a concave surface of large curvature directed toward the image; and
a rear group comprising, in order from the object side, a biconvex fourth lens, a biconcave fifth lens, a positive sixth lens and a seventh lens having a weak positive refractive power, said biconvex fourth lens not being cemented to any subsequent lenses.

2. A telephoto lens system as claimed in claim 1, wherein all of said lenses except the seventh lens are moved in unison to effect focusing.

3. A telephoto lens system as claimed in claim 2, wherein said system satisfies the following condition:

$$f/|f_{8.9}| < 0.7 \quad (1)$$

where, f is the focal length of the overall system;
$f_{8.9}$ is the focal length from the eighth to ninth surface (i.e., the aerial lens between the fourth and fifth lenses) as calculated by:

$$\frac{1}{f_{8.9}} = \left( \frac{1 - n_4}{r_8} + \frac{n_5 - 1}{r_9} - d_8 \cdot \frac{1 - n_4}{r_8} \cdot \frac{n_5 - 1}{r_9} \right)$$

$n_4$ is the refractive index of the fourth lens at the d-line;
$n_5$ is the refractive index of the fifth lens at the d-line;
$r_8$ is the radius of curvature of the surface of the fourth lens on the image side;
$r_9$ is the radius of curvature of the surface of the fifth lens on the object side; and
$d_8$ is the aerial distance between the fourth and fifth lenses.

4. A telephoto lens system according to claim 1, which further satisfies the following conditions:

$$1.5 < (n_1+n_2)/2 < 1.7 \quad (2)$$

$$55 < (\nu_1+\nu_2)/2 \quad (3)$$

$$0.05 < f/f_{1.6} < 0.35 \quad (4)$$

$$1.5 < f/f_{1.8} < 2.3 \quad (5)$$

$$0.0 < d_8/f < 0.04 \quad (6)$$

$$0.8 < f/f_{1.12} < 1.0 \quad (7)$$

where, $n_1$ is the refractive index of the first lens at the d-line;
$n_2$ is the refractive index of the second lens at the d-line;
$\nu_1$ is the Abbe number of the first lens;
$\nu_2$ is the Abbe number of the second lens;
$f_{1.6}$ is the focal length from the first to sixth surface;
$f_{1.8}$ is the focal length from the first to eighth surface; and
$f_{1.12}$ is the focal length from the first to twelfth surface.

5. A telephoto lens system according to claim 2, further satisfying the following table:

| | | | | |
|---|---|---|---|---|
| $F_{NO} = 1:2.0$ | | | $f = 100.00$ | |
| $\omega = 12.2°$ | | | $f_B = 39.91$ | |
| Surface No. | r | d | N | $\nu$ |
| 1 | 42.277 | 10.355 | 1.48749 | 70.2 |
| 2 | ∞ | 0.202 | | |
| 3 | 36.768 | 6.567 | 1.61800 | 63.4 |
| 4 | 75.567 | 7.143 | | |
| 5 | −417.542 | 2.021 | 1.63980 | 34.5 |
| 6 | 23.661 | 21.468 | | |
| 7 | 52.924 | 6.516 | 1.83400 | 37.2 |

-continued

| | | | | |
|---|---|---|---|---|
| 8 | −52.924 | 1.303 | | |
| 9 | −58.721 | 2.021 | 1.68893 | 31.1 |
| 10 | 36.540 | 6.243 | | |
| 11 | 58.045 | 3.576 | 1.83400 | 37.2 |
| 12 | 177.301 | 5.142 ~ | 20.765 | |
| 13 | 202.052 | 2.526 | 1.58913 | 61.2 |
| 14 | 734.879 | | | |

(1) $f / |f_{8.9}| = 0.427$
(2) $(n_1 + n_2)/2 = 1.553$
(3) $(\nu_1 + \nu_2)/2 = 66.8$
(4) $f / f_{1-6} = 0.205$
(5) $f / f_{1-8} = 2.016$
(6) $d_8 / f = 0.013$
(7) $f / f_{1-12} = 0.911$ wherein f is the focal length of the overall system, $F_{NO}$ is an F number, $\omega$ is a half viewing angle, $f_B$ is the back focus for an object at infinity, r is the radius of curvature of an individual lens surface, d is the lens thickness or aerial distance between adjacent lenses, N is the refractive index of an individual lens at the d-line, and $\nu$ is the Abbe number of an individual lens.

6. A telephoto lens system according to claim 2, further satisfying the following table:

$F_{NO} = 1:2.1$    $f = 100.00$
$\omega = 12.2°$    $f_B = 39.39$

Surface

-continued

| No. | r | d | N | $\nu$ |
|---|---|---|---|---|
| 1 | 41.137 | 10.606 | 1.48749 | 70.2 |
| 2 | −2824.967 | 0.202 | | |
| 3 | 41.450 | 6.465 | 1.61800 | 63.4 |
| 4 | 73.478 | 8.208 | | |
| 5 | −160.506 | 2.020 | 1.66680 | 33.0 |
| 6 | 28.446 | 19.042 | | |
| 7 | 50.901 | 6.667 | 1.80610 | 40.9 |
| 8 | −59.819 | 3.556 | | |
| 9 | −50.469 | 2.020 | 1.64769 | 33.8 |
| 10 | 41.218 | 6.519 | | |
| 11 | 85.053 | 3.636 | 1.83400 | 37.2 |
| 12 | −1906.667 | 4.097 | ~ | 19.754 |
| 13 | 193.969 | 2.525 | 1.58913 | 61.2 |
| 14 | 654.721 | | | |

(1) $f / |f_{8.9}| = 0.126$
(2) $(n_1 + n_2)/2 = 1.553$
(3) $(\nu_1 + \nu_2)/2 = 66.8$
(4) $f / f_{1-6} = 0.115$
(5) $f / f_{1-8} = 1.863$
(6) $d_8 / f = 0.036$
(7) $f / f_{1-12} = 0.911$ wherein f is the composite focal length of the overall system, $F_{NO}$ is an F number, $\omega$ is a half viewing angle, $f_B$ is the back focus for an object at infinity, r is the radius of curvature of an individual lens surface, d is the lens thickness or aerial distance between adjacent lenses, N is the refractive index of an individual lens at the d-line, and $\nu$ is the Abbe number of an individual lens.

* * * * *